USOO5626893A

United States Patent [19]
Reddy

[11] Patent Number: 5,626,893
[45] Date of Patent: May 6, 1997

[54] METHOD OF TREATING A DIVIDED CHEESE PRODUCT FOR ANTICAKING

[76] Inventor: Malireddy S. Reddy, 78 Cherry Hills Farm Dr., Englewood,, Colo. 80110

[21] Appl. No.: 324,897

[22] Filed: Oct. 18, 1994

[51] Int. Cl.$^6$ ........................................ A23C 9/12
[52] U.S. Cl. ........................ 426/36; 426/61; 426/96; 426/289; 426/582; 426/811
[58] Field of Search .................. 426/61, 89, 96–98, 426/289, 321, 334, 582, 811, 34, 36, 39, 295, 518, 658; 252/381, 383

[56] References Cited

U.S. PATENT DOCUMENTS

| 2,625,513 | 1/1953 | Kirschenbauer . | |
|---|---|---|---|
| 3,527,646 | 9/1970 | Scheick et al. | 426/289 |
| 4,062,647 | 12/1977 | Storm et al. | 8/137 |
| 4,168,328 | 9/1979 | Cheney et al. | 426/61 |
| 4,894,245 | 1/1990 | Kielsmeier et al. | 426/582 |
| 5,139,801 | 8/1992 | deJesus Montemayor et al. | 426/289 |
| 5,156,876 | 10/1992 | Clapp et al. | 426/811 |

FOREIGN PATENT DOCUMENTS 755772  8/1956  United Kingdom .

OTHER PUBLICATIONS

Derwent Abstract 49360c of Patent SU0698602, Nov. 1979 Butter Cheese Ind.

Food Chemistry, 2nd Edition, Ed. by Owen Fennema, Marcel Dekker Inc. 1985 pp. 666, 668, 673, 648, 678, 679.

Starch, Chemistry and Technology, 2nd Ed., Whistler, BeMiller, Paschall (eds) Academic Press, 1984, p. 616.

CFR: 21 CFR 170.3 U.S. Govt. Printing Office, 1983, pp. 359–361.

Practical Food Microbiology and Technology, 2nd Ed., Weiser, Mountney, Gould, AVI Publishing Co. Inc. 1971 pp. 52–68 Chapter 41.

Primary Examiner—Leslie Wong
Attorney, Agent, or Firm—Kyle W. Rost

[57] ABSTRACT

An anticaking agent which reduces the stickiness of the chunked, diced, or shredded cheese and improves the functionality of cheese is formulated of fine mesh vegetable flour, bentonite, cellulose, and antimycotic agents or bacterial cultures. This anticaking agent also will reduce the yeast and mold growth. This discovery is also extended to include various flavors, colors, enzymes and other supplements into the anticaking agent, to ultimately add to the cheese.

33 Claims, No Drawings

METHOD OF TREATING A DIVIDED CHEESE PRODUCT FOR ANTICAKING

TECHNICAL FIELD

The invention generally relates to foods and beverages. More specifically, the invention relates to means to treat foods by applying particulate material, especially an anticaking agent that reduces stickiness of chunked, diced, or shredded cheese and improves its functionality. The invention is particularly applicable to an anticaking agent for cheese, and to preparing pizza pie.

BACKGROUND ART

Anticaking agent in the food industry, especially in the dairy and cheese industry, is defined as any safe and suitable food ingredient which, when added, should prevent lumping of shredded, diced or chunked dairy product, such as cheese, during storage at room temperature or refrigerator or freezer. Such a dairy product with anticaking agent in it should be easy to handle at the time of applying on the final food product. Some cheeses, after they are chunked and if the anticaking agent is not used, will cake and are very difficult to handle. This is a serious problem especially with high moisture and high fat cheeses. Currently, at least 50% to 75% of the hard and semihard cheeses are either diced, shredded or chunked for sale in grocery stores, institutions, and major restaurant chains in the United States.

Several anticaking agents are commercially available, such as cellulose, microcrystalline cellulose, cellulose impregnated with glucose sugar and glucose oxidase enzyme, silicon dioxide, and sodium aluminum silicate. The major drawbacks of the existing anticaking agents are as follows:

1. Relatively expensive.
2. Deteriorates the product functionality in terms of performance in the finished products.
3. The product efficiency is questionable depending on the chemical specification of the cheese.
4. Too much dusting in the packaging room.
5. Health hazard to workers.
6. Excessive, unwanted bacteria and yeast and mold contamination.

Primarily, anticaking agents are formulated to include compounds which will eliminate sticking. One commonly used anticaking compound is cellulose, which is a fibrous vegetable material. Some formulations include starch in the anticaking agent, and many employ cellulose in combination with dextrose sugar and glucose oxidase. In the last mentioned case, the intent is to reduce oxygen in the packaged treated product in order to eliminate yeast and molds and, at the same time, to prevent the treated product from caking. One drawback with this kind of system when applied on pizza pie is that dextrose, used in anticaking agent, will increase browning of cheese when pizza pie is baked.

Also, the efficiency of such procedures to perform consistently is highly questionable because of the variance in chemical specifications of the cheeses. Enzymatic reactions require proper temperatures, moisture, pH, and, most importantly, time to react and produce the final result. In the pizza industry, it is a known problem that higher use of cellulose based anticaking agents tends to interfere with baking qualities of cheeses in terms of melt and browning. This problem is recent in origin because, formerly, temperatures of pizza baking ovens were maintained at 400° to 475° F. More recently, with the concept of fast served foods such as five minute pizza for lunch trade and 30 minute home delivery of pizza, pizza is baked at 575° to 650° F. With this higher temperature baking, the problems associated with cheese and anticaking agents are magnified. A serious problem is excessive browning and scorching of cheeses on pizza pie at such elevated temperatures.

In the prior art, flour has not been used as an anticaking agent on cheese, especially if the cheese will be used on pizza pie. Although flour may have a superior functionality in terms of reducing the stickiness of cheese, flour seriously interferes with the melting properties of cheese on pizza pie. Consequently, despite the economy of using flour as an anticaking agent, the food industry has been unable to take advantage of using food grade flours as anticaking agents in shredded cheese products, especially those intended for use on pizza pie.

DISCLOSURE OF INVENTION

Against the described background, it is therefore a general object of the invention to provide an improved anticaking product for use on cheese, especially in the pizza pie industry, wherein the product is economical and has superior functional properties of reducing sticking of chunked, diced or shredded cheeses.

A specific object is to provide an anticaking agent for use on cheese in the pizza pie industry, wherein the agent promotes the melt of cheese, reduces browning, and improves flavor.

Another object is to include in the anticaking agent a yeast and mold inhibitor that will not deteriorate the functional properties of the finished product.

A further object is to include flavor compounds in the anticaking agent to eliminate the flavor discrepancies in the finished product.

An important object is to provide a colored anticaking agent that will not bleach for a prolonged period of time when applied to colored cheeses.

Still another object is to include vitamins, especially fat soluble A&D, in the anticaking agent to fortify the vitamins in low fat or non-fat cheeses.

Additional objects, advantages and novel features of the invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

According to the invention, an anticaking agent is formed of flour and food grade bentonite. The latter, a form of montmorillonite clay, is also known as hydrous colloidal magnesium aluminum silicate, which may be used. Further aspects of the invention employ, in various combinations, cellulose, acidifying agents, defoamer, antimycotic agent, bacterial culture, enzymes, flavoring compounds, multivitamins, cheese color, and emulsifying agents, maltodextrin, starch, modified starch, and fiber.

To achieve the foregoing and other objects and in accordance with the purpose of the present invention, as embodied and broadly described herein, the product of this invention may comprise the following.

BEST MODE FOR CARRYING OUT THE INVENTION

The present invention is improved anticaking agents for use on cheese, especially in the pizza industry. Anticaking formulas have been developed that combine food grade bentonite, cellulose, and flour in various combinations with each other, individually and together. By appropriate selection and mixture these components and several other supplements, the appearance of both uncooked and finished pizza pie is substantially improved. Further, the melt, stretch, browning and tenderness of pizza cheese is uniformly improved. Remarkably, flavor also is improved by use of appropriate ingredients in the anticaking agent. In a further remarkable advance, the anticaking agent is able to extend the storage life of cheese and preserve its color over a long term. The preferred ingredients are finely milled, for example to 120 mesh, and have excellent handling characteristics. Especially the flour, bentonite, and cellulose are milled to a fine sieve size. The preferred flour is rice flour, although other flours can be used. The flour not only provides excellent anticaking characteristics, but also cooperates with cellulose to reduce its normal dustiness. The cellulose provides excellent flow properties and, further, greatly improves the ability of the anticaking agent to add color to cheese. The bentonite improves flavor and tenderness of cheese and also improves functionality of cellulose, even when flour is not present in the formula. Bentonite is a montmorillonite clay, and although the specific clay used was sodium montmorillonite or sodium bentonite, other food grade members of this family are expected to perform similarly. In combination with bentonite, it has been discovered that a defoaming agent is a substantial aid in improving melt, color and tenderness of cheese.

Another remarkable improvement is achieved by adding a biologic preservative to the anticaking agent. Suitable biologic preservatives include bacterial cultures of a variety of safe species, nontoxic to humans. Typical cultures are those as cheese starter cultures. The addition of these cultures provides a number of complex and beneficial improvements in cheese for pizza pie. Most directly, these cultures prevent growth of yeast and mold on the cheese for a substantial period of time. A more subtle and surprising result is attributed to the acidic nature of the culture, which lowers pH into a remarkably beneficial range around pH 5.0 to 5.3, where cheese has improved melt, improved color retention, and less browning. Similar improvement in melt and color retention can be achieved by direct addition of acids to the anticaking agent, as a means of lower pH to the desired range. Browning also can be reduced by direct addition of enzymes that remove sugars from the cheese, since excessive browning can result from scorched sugars. However, the ability to achieve these and other improvements by addition of an acidic biologic culture provides an efficient and effective solution of many existing problems in the pizza pie industry.

When an anticaking agent of appropriate formula was applied to cheese and baked on pizza pie, the tenderness of the cheese on pizza pie greatly improved. In the cheese industry, it has been a long standing goal to improve the tenderness of cheese on pizza pie, especially for delivery type pizzas. The pizza temperature, when delivered to homes, is at 120° F. as opposed to 140° to 160° F. when served in the restaurant. As cheese gets colder, it tends to get tougher on pizza and it will be more chewy in the mouth. This is an undesirable characteristic. While making the cheese itself, the protein must be broken significantly in order to have tenderness of cheese on pizza pie. However, such a cheese will exhibit excessive oiling-off on pie, which is a serious defect. Therefore, an important novel discovery of this invention is that this anticaking agent not only improves the tenderness of cheese but also decreases the oiling-off defect of cheese on pizza pie.

If it is preferred to release some oil on pizza pie but still maintain tenderness, this can be accomplished by adding a defoamer such as food grade polydimethyl siloxane. A defoamer tends to release the fat from cheese without interfering with the melt when included in the present anticaking agent. Also, when polydimethyl siloxane was included in the current anticaking agent, it tended to release slight amounts of oil. However, as pizza cooled, the oil went back into the body of the cheese. When food grade polydimethyl siloxane was tried without bentonite, but with other anticaking agents, it caused release of large amounts of oil that did not go back into the cheese. Thus, the present anticaking agent appears to be notably superior to other anticaking agents and promises significant benefits to the cheese and pizza industry.

With the modern practice of baking the pizza at high temperatures, many flavor components are driven out. A surprising and quite unexpected discovery in experiments with the present anticaking agent is that the flavor of pizza was improved. Comparisons to control pizza pie showed that cheese treated with this anticaking agent produced far superior flavor. Thus, a small amount of food grade bentonite and polydimethyl siloxane used in this formulation tends to lock the flavor and improve the melt in the cheese even after it is baked at high temperatures. Improving flavor retention of pizza is another long standing goal of the cheese and pizza industries.

Sorbic acid and potassium sorbate were tested in this anticaking agent to see if they could retard growth of yeast and molds both anticaking agent and also in the finished, treated cheese. These anti-molding agents were successful both in the anticaking agent and in the treated cheese, as they did decrease or eliminate molding in the cheese. Significantly, this appears to be the best way to apply anti-molding agent because it does not have to be applied in solution, as is required by other antimycotic agents on the market. Also, with the addition of acid antimycotic agents such as sorbic acid and propionic acid to the formula, the flavor of the cheese on pizza pie improved. This may be a result of an interaction with the food grade bentonite in the formulation.

Another means of retarding growth of yeast and mold in the finished cheese after the impregnation is by the addition of biological, all natural bacterial culture preparations.

With the discovery that an anticaking agent also is effective to apply anti-molding agents, this aspect of the invention was extended. The anticaking agent may include various flavors, colors, enzymes, spices, fruits, and fat soluble vitamins (A&D) so that these ingredients will end up in the cheese without having to be added separately, in a cumbersome way. Especially, vitamin fortification of low fat or non-fat cheeses can be greatly improved through use of a vitamin fortified anticaking agent.

Further, the present anticaking agent is less dusty and thus less harmful to the health of the workers in dice or shred departments.

The following examples further illustrate the novelty of our new anticaking agent:

EXAMPLE 1

This example was designed to study the effect of different mesh rice flours and sodium bentonite (highly colloidal hydrous magnesium aluminum silicate) on the functionality of cheeses on pizza pie. Three variations of a first anticaking agent were formulated using different mesh rice flour plus food grade bentonite.

| | | |
|---|---|---|
| 1. | Rice flour (<80 mesh, U.S. sieve series) | 90 parts |
| | Bentonite | 10 parts. |
| 2. | Rice flour (>80 mesh but <100 mesh U.S. sieve series) | 90 parts |
| | Bentonite | 10 parts. |
| 3. | Rice flour (>120 mesh, U.S. sieve series) | 90 parts |
| | Bentonite | 10 parts. |

As a control, three variations of a second anticaking agent were formulated using only the same mesh rice flours, but without any bentonite. All formulations were added to 7 to 10 days old freshly shredded mozzarella cheese. After being thoroughly mixed with anticaking agent, the cheese was applied to pizza shells smeared with tomato sauce. The cheese was applied at the rate of 9 ounces of treated cheese per 12 inch diameter pizza shell and baked at 550° F. for 6 minutes. After baking, the cheese was evaluated for the overall melt and stretch. The results are summarized in Table 1.

cheese on pizza pie. A mesh size of >120 mesh flour greatly improved the functionality of anticaking agent in the present formulation. Even though a coarser mesh rice flour can serve as an anticaking agent, in order to have better functionality the freer mesh flour is greatly preferred.

Adding bentonite greatly improved the tenderness of the cheese, regardless of the mesh size of the rice flour. Rice flour by itself diminished the tenderness of the cheese. The present anticaking agent with bentonite greatly improved the tenderness and melting properties of the cheese, in comparison to the control cheese, which lacked added bentonite.

EXAMPLE 2

An example was designed to compare the effectiveness of a first anticaking agent composed of bentonite and rice flour to a control anticaking agent composed of straight cellulose. The first anticaking agent was prepared by blending >120 mesh, U.S. sieve size, rice flour with bentonite. Straight cellulose was used as the control anticaking agent. Both anticaking agents were applied at the rate of 1.0% and 2.0%

TABLE 1

| No. | Anticaking formula used | Pizza evaluation for tenderness | Pizza Evaluation for melt & stretch | Anticaking properties | Undersirable graininess in the cheese |
|---|---|---|---|---|---|
| 1. | Rice flour (<80 mesh) & bentonite | Good (+++) | Fair (++) less than 4" stretch | ++ | Excessive |
| 2. | Rice flour only | Poor (+) | Poor (+) | + | Excessive |
| 3. | Rice flour (>80 mesh but <100 mesh) and bentonite | Good (+++) | Good, greater than 4" stretch | ++++ | Slightly coarse |
| 4. | Rice flour, alone (>80 mesh but <100 mesh) | Poor (+) | Poor (+) | +++ | Slightly coarse |
| 5. | Rice flour (>120 mesh) and bentonite | Excellent (++++) | Excellent (++++) greater than 6" stretch | ++++ | No coarseness or graininess |
| 6. | Rice flour, alone (>120 mesh) | Fair (++) | Fair (++) | ++++ | No coarseness or graininess |
| 7. | No anticaking agent added to the cheese | Fair (++) | Good, greater than 4" stretch | + | No coarseness or graininess |

The results clearly indicate that control anticaking agent made exclusively of rice flour was not satisfactory in terms of functionality of cheese on pizza pie, even though it exhibited anticaking properties in the raw cheese. The addition of bentonite to rice flour greatly improved both the anticaking properties and, more importantly, improved the functionality of the cheese on pizza pie. Further, this example clearly proved that the mesh size of the rice flour does play a significant role in improving the functionality of by weight into freshly shredded mozzarella cheese. The treated cheese was placed on pizza shells using 9 ounces of cheese per 12" diameter pizza shell smeared with tomato sauce. The pizza was baked as described in Example 1. The results are presented in Table 2.

TABLE 2

| No. | Anticaking Formula | % Anticaking agent used | White specks on cheese | Anticaking properties when applied to cheese | Pizza evaluation for: | | |
|---|---|---|---|---|---|---|---|
| | | | | | Melt | Stretch | Tenderness |
| 1. | 97.5% Rice flour and 2.5% Bentonite | 1.0 | No visible white specks | ++++ | Excellent (++++) | Excellent (>6 inches) | Extremely tender (++++) |
| 2. | | 2.0 | No visible white specks | ++++ | Good (+++) | Excellent (>6 inches) | Extremely tender (++++) |
| 3. | 100% Cellulose | 1.0 | Few visible white specks | ++++ | Excellent (++++) | Excellent (>6 inches) | Slightly tender (++) |
| 4. | | 2.0 | Distinct undesirable white powdery specks | ++++ | Fair (++) | Excellent (>6 inches) | Slightly tough (+) |

The results clearly indicate that cellulose alone did impart white discoloration on cheese even at 1.0% level. The white discoloration of cheese is considered undesirable because the customer may believe it is mold growth or some foreign body in the cheese. Also, pizza evaluation revealed the first anticaking agent, composed of rice flour and bentonite, was far superior to the cellulose control in terms of improving the tenderness and melt even though the stretch was not significantly different. Overall, both anticaking agents were equally good in terms of eliminating clumping of cheese. Therefore, although cellulose has good properties as an anticaking agent, alone it is unsatisfactory when used on cheese.

EXAMPLE 3

In order to improve the melting properties of cheese, even when a high concentration (2%) of anticaking agent is used, the following example was designed. Polydimethyl siloxane was added at the rate of 0.01% and 0.1% to the two anticaking agents of Example 2. After the two anticaking agents were thoroughly blended, each was added at the rate of 2% by weight to freshly shredded mozzarella cheese. The cheese was placed on pizza shells and the pizzas were baked using the same procedure outlined in Example 1. The results are summarized in Table 3.

exhibited superior tenderness and flavor retention as compared to the control. The flavor was driven out of the control cheese in the pizza oven when heated to 550° to 650° F. for 5 to 6 minutes. However, cheese impregnated with the first anticaking agent formula retained the flavor in the cheese, even when it was heated to such a high temperature.

In a surprising result, the addition of food grade polydimethyl siloxane to the anticaking agent greatly improved the color of the cheese on pizza pie, upon baking. The original intention of including small amounts of food grade polydimethyl siloxane into the anticaking agent was to slightly improve the melt. However, it now has been discovered that in addition to improving the melt, polydimethyl siloxane greatly improved the color of the pizza, eliminating scorching, upon baking at elevated temperatures.

EXAMPLE 4

Prior examples have shown that the combination of rice flour, food grade bentonite, and polydimethyl siloxane, when used as anticaking agent and applied onto cheese, greatly improved the appearance of cheese. Upon baking on a pizza shell, melt, tenderness and flavor retention also are greatly improved. A further example was designed to determine whether the addition of cellulose can further improve the melt, tenderness and flavor of cheese on pizza.

TABLE 3

| No. | Anticaking agent formula used | | Cheese color after anticaking application | Pizza evaluation for: | | | | |
|---|---|---|---|---|---|---|---|---|
| | | | | Melt | Stretch | Tenderness | Flavor | Color |
| 1. | None: Cheese only | | Normal: no white specks | ++ | >6 inches ++++ | ++ Slight tenderness | ++ | ++ |
| 2. | Rice flour Bentonite Polydimethal siloxane | 97.99 2.0 .01 | Normal: no white specks | +++ | >6 inches ++++ | ++++ Extremely tender | ++++ | +++ |
| 3. | Rice flour Bentonite Polydimethyl siloxane | 97.90 2.0 .10 | Normal: no white specks | ++++ | >6 inches ++++ | ++++ Extremely tender | ++++ | ++++ |
| 4. | Cellulose Polydimethyl siloxane | 99.99 .01 | Distinct white powdery specks | +++ | >6 inches ++++ | + Slightly tough | ++ | +++ |
| 5. | Cellulose Polydimethyl siloxane | 99.90 0.10 | Distinct white powdery specks | ++++ | >6 inches ++++ | + Slightly tough | ++ | ++++ |
| 6. | Rice flour Bentonite | 98.0 2.0 | Normal: no white specks | ++ | >6 inches ++++ | ++++ Extremely tender | ++++ | ++ |
| 7. | Cellulose | 100.0 | Distinct white powdery specks | + | <6 inches ++++ | + Slightly tough | ++ | ++ |

Excellent = ++++
Good = +++
Fair = ++
Poor = +

In this example, it is quite obvious that the addition of polydimethyl siloxane to both the anticaking agents distinctly improved the melting properties and color of the cheese on pizza. Prior to baking, the control anticaking agent, containing cellulose, exhibited white specks on cheese. No white specks were observed with the rice flour based first anticaking agent. Also, the first anticaking agent Four different anticaking agents were blended using rice flour and cellulose as major ingredients and bentonite and polydimethyl siloxane as minor ingredients. The anticaking agents were blended with freshly diced mozzarella cheeses and pizza were made and evaluated as outlined in Example 1. The results are presented in Table 4.

TABLE 4

| No. | Anticaking agent formula used | | Cheese color after anticaking application | Dusting properties of anticaking agent | Flow properties of anticaking agent | Pizza evaluation for: | | | |
|---|---|---|---|---|---|---|---|---|---|
| | | | | | | Melt | Stretch | Tenderness | Flavor |
| 1. | Rice flour<br>Bentonite<br>Polydimethyl siloxane | 98.45<br>1.5<br>.05 | Normal:<br>no white specks | Least dusty | ++ | ++++ | >6 inches | ++++ | ++++ |
| 2. | Cellulose<br>Bentonite<br>Polydimethyl siloxane | 98.45<br>1.5<br>.05 | Few white specks observed | Extremely dusty | ++++ | ++++ | >6 inches | +++ | ++++ |
| 3. | Rice flour<br>Cellulose<br>Bentonite<br>Polydimethyl siloxane | 75.00<br>23.45<br>1.50<br>.05 | Normal:<br>no white specks | Least dusty | ++++ | ++++ | >6 inches | ++++ | ++++ |
| 4. | Cellulose<br>Rice flour<br>Bentonite<br>Polydimethyl siloxane | 75.00<br>23.45<br>1.50<br>.05 | Normal:<br>no white specks | Moderately dusty | ++++ | ++++ | >6 inches | ++++ | ++++ |
| 5. | Control: cheese only, no anticaking agent | | Normal:<br>no white specks | Not applicable | Not applicable | ++++ | >6 inches | ++ | ++ |
| 6. | Cellulose | | Distinct white powdery specks | Extremely dusty | ++++ | ++ | >6 inches | + | ++ |

Excellent = ++++
Good = +++
Fair = ++
Poor = +

The results show that the addition of bentonite and polydimethyl siloxane to cellulose greatly improved the functionality of the cellulose base anticaking agent in terms of overall appearance of the cheese, melt, tenderness and flavor retention of cheese on pizza. Further, while conducting this example, it was observed that the addition of cellulose to rice flour improved the flowability of the product. This could be due to the puffy nature of the cellulose. Conversely, the addition of rice flour to cellulose greatly improved the color of the anticaking agent. When such an agent is applied onto cheese, it did not exhibit white powdery specks. Also, in this example it was observed that cellulose is far less dusty when applied in these anticaking agent formulas containing flour, bentonite, and polydimethyl siloxane, as compared to application of cellulose alone. This reduction in dustiness is extremely important for the health and well-being of people who work in dice and shred lines. In the Example 4, even formula no. 2, which contained cellulose, bentonite, and polydimethyl siloxane, but no flour, resulted in enhanced flavor and improved qualifies of baked cheese. Further experiments showed that even small amounts of cellulose, such as 2.5% to 10%, when applied in these anticaking agent formulas, improved flowability without infusing any dusting properties.

EXAMPLE 5

This example was designed to investigate whether antimycotic agents can be incorporated in an anticaking agent to retard the yeast and mold growth in the finished cheese. In the art, the antimycotic agents have been used only on the surface of cheese by either dipping into the antimycotic solution prior to dicing or by spraying after the cheeses is diced or shredded.

The following anticaking agent formulas were prepared, with ingredients shown in weight percent:

| 1. | Rice flour | 75.75 |
|---|---|---|
| | Cellulose | 20.00 |
| | Bentonite | 2.00 |
| | Sorbic acid | 1.75 |
| | Polydimethyl siloxane | 0.50 |
| 2. | Rice flour | 85.75 |
| | Cellulose | 10.00 |
| | Bentonite | 1.50 |
| | Sodium propionate | 2.50 |
| | Polydimethyl siloxane | 0.25 |
| 3. | Rice flour | 93.80 |
| | Bentonite | 5.00 |
| | Natamycin | 0.20 |
| | Polydimethyl siloxane | 1.00 |
| 4. | Rice flour | 64.45 |
| | Cellulose | 30.00 |
| | Bentonite | 5.00 |
| | Sorbic acid | 0.50 |
| | Natamycin | 0.05 |
| 5. | Rice flour | 62.50 |
| | Cellulose | 35.00 |
| | Bentonite | 2.00 |
| | Polydimethyl siloxane | 0.50 |

These five anticaking agents were blended separately, added at the rate of 2.0% by weight into freshly diced mozzarella cheese, and refrigerated at 4° C. for a period of one month. The one pound samples were examined at weekly intervals to check for the yeast and mold colonies. A sample of cheese without any anticaking agents served as a control. The results are presented in Table 5. All the cheese samples, with and without anticaking agents, were baked and evaluated at the end of the fourth week using the same procedure outlined in Example 1.

TABLE 5

| Anticaking formula # | Yeast and mold growth at: | | | | Pizza evaluation at end of 4th week for: | | | |
|---|---|---|---|---|---|---|---|---|
| | Week #1 | Week #2 | Week #3 | Week #4 | Melt | Stretch | Tenderness | Flavor |
| 1. | None | None | None | None | ++++ | ++++ | ++++ | ++++ |
| 2. | None | None | None | None | ++++ | ++++ | ++++ | ++++ |
| 3. | None | None | None | None | ++++ | ++++ | ++++ | ++++ |
| 4. | None | None | None | None | ++++ | ++++ | ++++ | ++++ |
| 5. | None | None | 4 mold colonies | 15 mold colonies | *ND | *ND | *ND | *ND |
| Control — without anticaking agent | None | None | 5 mold colonies | 20 mold colonies | *ND | *ND | *ND | *ND |

Excellent = ++++
*ND = Not determined because cheese was moldy.

The above results indicate that antimycotic agents can be blended with anticaking agent and can be safely applied onto the cheese without having to apply them as liquids. The formulas of this example seem to enhance the retardation of yeast and mold even when the concentrations of antimycotic agents are subnormally low. Also, bake analysis proved that the inclusion of antimycotic in these anticaking agents did not interfere with physical appearance, melt, stretch, flavor, and tenderness properties of cheese on pizza pie.

Similar experiments were conducted using shredded cheddar, monterey jack, and grated parmesan and romano cheeses. Here again, the anticaking agent eliminated the stickiness of the cheese and at the same time retarded the yeast and molds. One significant discovery is that the flavor in romano and parmesan cheeses was greatly enhanced with the use of these anticaking agents, and flavor did not diminish for a period of 1½ years when stored at 4° C. and at room temperature. This discovery offers significant benefits to commercial users such as restaurants and pizza parlors, because these grated cheeses are left at room temperature in open containers in these businesses.

EXAMPLE 6

This example evaluates the effect of a biological preservative on retardation of yeast and mold growth in cheese. A biological preservative is prepared by first formulating a dry basic nutrient medium. Suitable ingredients and percentages by weight include:

Protein source such as sweet whey — 68.0%
Autolyzed yeast extract — 10.0%
Carbohydrate source such as dextrose — 5.0%
Nonfat dry milk — 5.0%
Food grade bentonite — 5.0%
Calcium carbonate — 2.5%
Sodium citrate — 2.0%
Citric acid — 0.5%
Polydimethyl siloxane — 2.0%

A liquid culture is prepared by reconstituting the medium at the rate of 10% solids by weight in warm water. Next, using acid or base neutralizer, pH is adjusted to 6.5 to 6.7. The medium is heated with constant agitation to 190° F. and held at that temperature for 45 minutes to one hour. Then the medium is cooled to 90° to 95° F. and inoculated with individual strains of lactococcus lactis ssp. cremoris, lactococcus lactis ssp. lactis, lactococcus lactis ssp. lactis bio var diacetylactis, pediococcus cerevisiae, pediococcus acidilactici, pediococcus pentosaeceus, streptococcus salivarius ssp. thermophilus, propionibacterium shermanii, propionibacterium freudenreichii, leuconostoc mesenteroides ssp. cremoris, leuconostoc mesenteroides ssp. dextranicum, lactobacillus acidophilus, lactobacillus bulgarieus, lactobacillus lactis, lactobacillus helveticus, and bifidobacterium bifidus. The cultures can be grown individually or in selective combinations. The organisms are allowed to grow until pH drops to 4.5 to 5.5. If preferred, the cultures can be neutralized several times to enhance growth and production of end products. Next, the medium is cooled to 50° F. by circulating cold water through a cooling chamber. Then, the cultures are acidified to pH 3.0 to 4.0 using organic acids such as lactic, sorbic, propionic, or acetic. The liquid cultures are blended in a separate sterile vessel with dried vegetable flour or other suitable food grade dry material to bring it to a doughy consistency, thereby producing a culture preparation. The culture preparation is extruded, dried, and milled aseptically to the consistency of fine mesh powder, to incorporate into the anticaking agent.

The cultures selected to prepare a biological preservative are nontoxic and are generally regarded as safe for human consumption. The preferred bacteria are those that favor production of organic acids such as propionic acid, acetic acid, lactic acid and the like, and other natural inhibitors such as diacetyl, peroxides and bacteriocins. Further, in order to improve the efficiency and economy of producing anticaking agent, these cultures were prepared including food grade bentonite, polydimethyl siloxane to reduce foam, and other desired functional additives to the anticaking agent formula, including organic acids. Thus, when the cultures were added to the anticaking agent formula, they provided a source of bentonite and polydimethyl siloxane and contribute to pH adjustment. Also, anyone skilled in the field can pick and choose these organisms, since they function singly or in combinations.

Using the above prepared biological food culture (dried cheese culture), the following anticaking agents were prepared:

| 1. | Rice flour | 60.00 |
|---|---|---|
| | Cellulose | 30.00 |
| | Dried cheese culture | 10.00 |
| 2. | Rice flour | 77.50 |
| | Cellulose | 15.00 |
| | Dried cheese culture | 7.50 |
| 3. | Rice flour | 92.75 |
| | Bentonite | 2.00 |
| | Dried cheese culture | 5.00 |
| | Polydimethyl siloxane | 0.25 |
| 4. | Rice flour | 90.40 |
| | Cellulose | 7.50 |
| | Bentonite | 0.50 |
| | Sorbic acid | 1.50 |
| | Polydimethyl siloxane | 0.10 |
| 5. | Rice flour | 94.45 |

-continued

| | |
|---|---|
| Cellulose | 5.00 |
| Bentonite | 0.50 |
| Polydimethyl siloxane | 0.50 |

These five anticaking agents, with and without biological preservatives (dried cheese cultures), were added individually at the rate of 2.0% by weight to a freshly shredded mozzarella cheeses and let sit for a period of one month at 4° C. Visual inspection of the cheese for yeast and molds was done once a week. An anticaking agent containing sorbic acid served as a positive control, while an anticaking agent without sorbic acid or dried cheese cultures served as a negative control. Shredded cheese without any anticaking agents served as a cheese control. All the cheeses were tested on pizzas for bake performance at the end of four weeks. The results are summarized in Table 6.

In a further investigation, galactose oxidase enzyme was added to the anticaking agent. This enzyme can metabolize galactose sugar to D-galactohexodialdose and hydrogen peroxide. Galactose sugar can induce significant browning reaction on pizza cheese. Therefore, no extra sugar was added to the anticaking agent. The residual amount of glucose sugar present in cheese was anticipated to be sufficient to react with glucose oxidase and thus reduce oxygen. In one example, glucose oxidase enzyme was added to the dried cheese cultures of Example 6 to ensure elimination of yeast and mold growth in the cheese. The following anticaking formulas were prepared, with ingredients expressed in weight percent:

TABLE 6

| | Anticaking agent | Yeast and mold growth at: | | | | Bake evaluation at end of 4 weeks: | | | |
|---|---|---|---|---|---|---|---|---|---|
| No. | formula number | Week 1 | Week 2 | Week 3 | Week 4 | Melt | Stretch | Tenderness | Flavor |
| 1. | 1 | None | None | None | None | ++++ | >6 inches | ++++ | ++++ |
| 2. | 2 | None | None | None | None | ++++ | >6 inches | ++++ | ++++ |
| 3. | 3 | None | None | None | None | ++++ | >6 inches | ++++ | ++++ |
| 4. | 4 | None | None | None | None | ++++ | >6 inches | ++++ | ++++ |
| 5. | 5 | None | None | 8 mold colonies | 33 mold colonies | *NE | *NE | *NE | *NE |
| 6. | Control — without anticaking agent | None | None | 12 mold colonies | 35 mold colonies | *NE | *NE | *NE | *NE |

Excellent = ++++
*NE = not evaluated because cheese is already moldy.

It is apparent from Table 6 that the dried cheese culture grown and dried according to the outlined procedure, when incorporated in anticaking agent and then placed in cheese, retarded the growth of yeast and molds without altering the functional properties of cheese on pizza. Such a biological preservative is preferred over pure chemical preservatives due to aesthetic reasons. Each of the cultures used in this example is a cheese starter culture and is considered GRAS (generally regarded as safe). Even though mixed cultures were used to manufacture the dried cheese culture, the example is indicative that single cultures or combinations of two cultures also would retard growth of yeast and molds without deteriorating the quality of the cheese.

EXAMPLE 7

This example investigates the addition of dried preparations of glucose oxidase, glucose oxidase/catalase, galactose oxidase, galactose oxidase/catalase in the anticaking agent to retard growth of yeast and molds. In the prior art, glucose oxidase enzyme was combined with glucose in cellulose based anticaking agents. It was anticipated that glucose oxidase enzyme could oxidize glucose to gluconic acid and hydrogen peroxide. In so doing, it could consume a portion of the oxygen in a package of treated product. Since yeast and mold require oxygen for their growth, these additives should diminish such growth. A drawback with this procedure is that if glucose is added to the anticaking agent, and thus to the cheese, residual glucose will induce browning of pizza cheese when baked under typical pizza baking conditions. Also, simple sugars such as glucose, if they are left in cheese, encourage growth of pathogenic and unwanted bacteria. Accordingly, glucose was not added to the present anticaking agent.

| | | |
|---|---|---|
| 1. | Rice flour | 88.75 |
| | Cellulose | 9.50 |
| | Dried glucose oxidase enzyme preparation | 0.25 |
| | Ascorbic acid | 0.50 |
| | Bentonite | 0.50 |
| | Polydimethyl siloxane | 0.50 |
| 2. | Rice flour | 88.75 |
| | Cellulose | 10.00 |
| | Dried glucose oxidase/catalase enzyme preparations | 0.25 |
| | Bentonite | 0.50 |
| | Polydimethyl siloxane | 0.50 |
| 3. | Rice flour | 88.75 |
| | Cellulose | 10.00 |
| | Dried galactose oxidase/catalase enzyme preparation | 0.25 |
| | Bentonite | 0.50 |
| | Polydimethyl siloxane | 0.50 |
| 4. | Rice flour | 88.00 |
| | Cellulose | 10.00 |
| | Dried cheese culture | 2.00 |
| 5. | Rice flour | 87.75 |
| | Cellulose | 10.00 |
| | Dried glucose oxidase/catalase enzyme preparation | 0.25 |
| | Dried cheese culture | 2.00 |
| 6. | Rice flour | 88.10 |
| | Cellulose | 10.00 |
| | Dried glucose oxidase, galactose oxidase & catalase enzyme preparations | 0.25 |
| | Bentonite | 1.50 |
| | Polydimethyl siloxane | 0.15 |
| 7. | Rice flour | 87.75 |
| | Cellulose | 10.00 |
| | Dried glucose oxidase, galactose oxidase, & catalase enzyme preparations | 0.25 |
| | Dried cheese culture | 2.00 |
| 8. | Rice flour | 87.50 |
| | Cellulose | 10.00 |
| | Dried glucose oxidase, galactose oxidase, lactase, & catalase enzyme preparations | 0.25 |

|   | | |
|---|---|---:|
|   | Dried cheese culture | 2.00 |
| 9. | Rice flour | 87.50 |
|   | Cellulose | 10.00 |
|   | Bentonite | 2.00 |
|   | Polydimethyl siloxane | 0.50 |

The above anticaking agents were included into freshly diced mozzarella cheese at the rate of 2.0% by weight and stored at 4° C. for a period of four weeks. The cheeses were examined at weekly intervals for the visible yeast and mold growth. The pizza bake analysis was conducted at the end of two weeks storage. The results are summarized in Table 7.

Both natural and artificial colors have been tried using the following anticaking agent formulas, in which ingredients are expressed in weight percent:

|   | | |
|---|---|---:|
| 1. | Rice flour | 95.00 |
|   | Bentonite | 3.00 |
|   | Polydimethyl siloxane | 1.00 |
|   | Water base annatto color | 1.00 |
| 2. | Rice flour | 93.40 |
|   | Cellulose | 5.00 |
|   | Bentonite | 0.10 |
|   | Polydimethyl siloxane | 0.50 |
|   | Glucose oxidase, lactase, & catalase enzyme | 0.50 |

TABLE 7

| Anticaking Formula Number | Yeast and mold growth at: | | | | Bake evaluation at end of 4 weeks: | | | | |
|---|---|---|---|---|---|---|---|---|---|
|  | Week 1 | Week 2 | Week 3 | Week 4 | Melt | Stretch | Browning | Tenderness | Flavor |
| 1. | None | None | None | 10 mold colonies | ++++ | >6 inches | Slight | ++++ | ++++ |
| 2. | None | None | None | 8 mold colonies | ++++ | >6 inches | Slight | ++++ | ++++ |
| 3. | None | None | None | 5 mold colonies | ++++ | >6 inches | Slight | ++++ | ++++ |
| 4. | None | None | None | None | ++++ | >6 inches | Moderate | ++++ | ++++ |
| 5. | None | None | None | None | ++++ | >6 inches | Slight | ++++ | ++++ |
| 6. | None | None | None | 3 mold colonies | ++++ | >6 inches | None | ++++ | ++++ |
| 7. | None | None | None | None | ++++ | >6 inches | None | ++++ | ++++ |
| 8. | None | None | None | None | ++++ | >6 inches | None | ++++ | ++++ |
| 9. | None | None | 12 mold colonies | 33 mold colonies | ++++ | >6 inches | Moderate | ++++ | ++++ |
| Control — without anticaking agent | None | None | 23 mold colonies | 39 mold colonies | +++ | >6 inches | Distinctive | ++ | ++ |

Excellent = ++++
Good = +++
Fair = ++
Poor = +

The results indicate that the growth of yeast and mold was not retarded with the inclusion of enzyme preparations. However, wherever the enzyme preparations were included, the browning of mozzarella cheese was significantly reduced compared to the control. The best results in terms of reduction of browning as well as reduction of yeast and molds were observed when both the glucose oxidase and galactose oxidase enzyme preparations were included along with the biological preservative (dried cheese culture). The inclusion of nontoxic enzyme preparations in the anticaking agent did not alter the functional properties of the cheese. This result is favorable, since scorching of cheese can be largely eliminated using the anticaking agents of this example. A further favorable result is that eliminating residual sugars such as glucose and galactose will discourage the growth of pathogenic bacteria in the cheese.

EXAMPLE 8

White anticaking agent is objectionable to use in colored cheeses such as yellow colored cheddar. In order to eliminate this defect, anticaking agent can be colored with natural and/or artificial colors to match the cheese. However, colored anticaking agents in the prior art, such as cellulose dyed anticaking agents, do not retain their colors for a long time. At the time of application, they look orange-yellow on cheese. But upon storage, the color reverts and the white anticaking agent will look like a foreign body on the yellowish cheddar. Often a customer will return the cheese, thinking the cheese is moldy.

This example employs anticaking agent colored with annatto color. The agent then was applied to the cheese to see if the color could be retained for a long period of time.

|   | | |
|---|---|---:|
|   | preparations | |
|   | Oil-based annatto color | 0.50 |
| 3. | Rice flour | 78.15 |
|   | Cellulose | 15.00 |
|   | Dried cheese culture | 4.50 |
|   | Vitamin C | 0.50 |
|   | Glucose oxidase, galactose oxidase, lactase, & catalase dried enzyme preparations | 1.00 |
|   | Oil based annatto color | 0.50 |
|   | Orange G#6 | 0.35 |
| 4. | Rice flour | 91.75 |
|   | Cellulose | 5.90 |
|   | Bentonite | 0.10 |
|   | Sorbic acid | 1.75 |
|   | Oil based annatto color | 0.40 |
| 5. | Rice flour | 97.10 |
|   | Cellulose | 1.00 |
|   | Dried cheese culture | 0.50 |
|   | Glucose oxidase & catalase enzyme preparations | 0.50 |
|   | Sorbic acid | 0.50 |
|   | Oil based annatto color | 0.40 |
| 6. | Rice flour | 88.25 |
|   | Cellulose | 8.50 |
|   | Dried cheese culture | 2.50 |
|   | Glucose oxidase & catalase enzyme preparations | 0.75 |

According to the procedures employed, each formula was mixed, and the color of the anticaking agent was evaluated right after mixing. A 100 gm. sample was left at room temperature for a period of two months to evaluate the color retention properties of the anticaking agent, alone. In addition, all of the above anticaking agent formulas, after blending with appropriate colors, were mixed with colored shredded cheddar cheese. After mixing, the cheese was evaluated for the distribution of color. Then the cheese was placed at 4° C. for a period of two months, after which it was evaluated for the color retention as well as for mold growth. The results are presented in Table 8.

TABLE 8

| Anticaking formula | Color of the anticaking agent itself at "0" time | Color of the anticaking agent itself after two months | Color intensity of the cheddar cheese immediately after application of anticaking agent | Color intensity of the cheddar cheese after two months at 4° C. | Yeast and mold growth after 8 weeks storage at 4° C. |
|---|---|---|---|---|---|
| 1. | + | + | ++ | + | Positive |
| 2. | ++ | + | ++ | + | Positive |
| 3. | ++++ | ++++ | ++++ | ++++ | Negative |
| 4. | +++ | +++ | +++ | +++ | Negative |
| 5. | ++++ | ++++ | ++++ | ++++ | Negative |
| 6. | *NA | *NA | + | + | Negative |

Excellent = ++++
Good = +++
Fair = ++
Poor = +
*NA = not applicable

It is apparent from the data in this table that oil base annatto color is far superior to water base. The experiments also showed that when sorbic acid and/or dried cheese culture is present, the color intensity is better and it does not fade with age. This may be due to the lower pH of these products. It appears that the lower pH of the anticaking agent is a solution for maintaining the color of the anticaking agent. Later experiments proved that other organic acids, including ascorbic acid, and some inorganic acids also can be used in these anticaking agents to lower pH, in order to maintain the color without reversion. Experiments also show that artificial colors such as orange G#6 can also be blended to improve the color. Thus, this example has shown that an acidic pH in the anticaking agent is a prime factor in intensifying as well as retaining the color. Further, since the pH of cheese tends to be acidic, a low pH anticaking agent is to be preferred.

EXAMPLE 9

From the previous example it is known that the acidic pH of the anticaking agent was essential for the retention of color for a prolonged period. Since the pH of the cheese tends towards the acidic side, an experiment was devised in which the pH of the anticaking agent was adjusted towards the acidic side, so that incorporation of the anticaking agent into cheese will not alter the pH of the cheese. This experiment is designed to determine the effect of the pH of the anticaking agent on the functionality of mozzarella cheese on pizza pie. The following base anticaking agent formula was designed to study the effects of pH:

| | | |
|---|---|---|
| Rice flour | 89.45 | parts |
| Bentonite | 0.05 | parts |
| Polydimethyl siloxane | 0.50 | parts |
| Cellulose | 10.00 | parts |

The pH of the above anticaking agent is 6.3. Sufficient amounts of sorbic, phosphoric and propionic acids were added individually to the anticaking agent to adjust the pH to 6.0, 5.5, 5.0, 4.5 and 2.0. The anticaking agent with each different pH was added to freshly shredded mozzarella cheese at the rate of 2.0% by weight and baked using the procedure outlined in Example 1. Table 9 presents the results of this experiment.

TABLE 9

| Type of acid used in Anticaking Agent | pH of the Anticaking Agent | Evaluation of cheese on pizza for: | | | |
|---|---|---|---|---|---|
| | | Browning | Melt | Stretch | Tenderness |
| Sorbic acid | 6.0 | Moderate | +++ | +++ | ++++ |
| | 5.5 | Moderate | ++++ | +++ | ++++ |
| | 5.0 | Slight | ++++ | ++++ | ++++ |
| | 4.5 | None | ++++ | ++++ | ++++ |
| | 2.0 | None | +++ | +++ | ++++ |
| Phosphoric acid | 6.0 | Moderate | +++ | +++ | ++++ |
| | 5.5 | Slight | +++ | ++++ | ++++ |
| | 5.0 | None | ++++ | ++++ | ++++ |
| | 4.5 | None | ++++ | ++++ | ++++ |
| | 2.0 | None | ++++ | +++ | ++++ |
| Propionic acid | 6.0 | Moderate | +++ | +++ | ++++ |
| | 5.5 | Moderate | +++ | +++ | ++++ |
| | 5.0 | Slight | ++++ | ++++ | ++++ |
| | 4.5 | None | ++++ | ++++ | ++++ |
| | 2.0 | None | +++ | +++ | ++++ |

Excellent = ++++
Good = +++
Fair = ++
Poor = +

The results clearly show that anticaking agents of pH<5.5 are far superior to anticaking agents of pH≧5.5 in terms of improving the melt and decreasing the formation of browned spots on the cheese. Further, tests suggest that pH as low as pH 4.0 to pH 4.5 are beneficial, although it appeared that a preferred range is pH 4.75 to pH 5.3. The reduction of browning is especially significant, since pizzas are baked at high temperatures, at which cheese tends to burn. Similar results were obtained in additional experiments conducted using acidifying agents such as citric, acetic, ascorbic, hydrochloric and lactic acids, as well as low pH cheese starter culture, indicating the pH of the anticaking agent has great significance in reducing the browning of cheese on pizza and improving the melt.

EXAMPLE 10

The anticaking agent is odorless and thus may dilute the flavor of some cheeses when incorporated at the 2% level. To offset this, natural or artificial flavors such as butter or diacetyl can be added to the anticaking agent. For example, cheddar cheese flavor can be added to the anticaking agent to be used in cheddar. Similarly, romano, parmesan, and mozzarella flavors can be added to arrive at customized anticaking agents to suit the needs of a particular cheese.

TABLE 10

| Anticaking formula used | Type of cheese | Flavor evaluation at: | | | | | Bake evaluation for flavor at: | |
|---|---|---|---|---|---|---|---|---|
| | | 0 time | 1 month | 2 months | 6 months | 9 months | 0 time | 1 month |
| None | Parmesan | +++ | +++ | +++ | ++ | + | *ND | *ND |
| 1 | | ++++ | ++++ | ++++ | ++++ | ++++ | *ND | *ND |
| 2 | | ++++ | ++++ | +++ | ++ | + | *ND | *ND |
| None | Romano | +++ | +++ | +++ | + | + | *ND | *ND |
| 3 | | ++++ | ++++ | ++++ | +++ | +++ | *ND | *ND |
| None | Cheddar | ++ | ++ | ++ | ++ | ++ | *ND | *ND |
| 4 | | +++ | +++ | +++ | +++ | +++ | *ND | *ND |
| None | Mozzarella | + | + | ++ | *ND | *ND | + | + |
| 4 | | ++++ | ++++ | ++++ | *ND | *ND | +++ | +++ |
| 5 | | ++++ | ++++ | ++++ | *ND | *ND | +++ | +++ |

Excellent = ++++
Good = +++
Fair = ++
Poor = +
*ND = Not determined.

Conversely, blended flavors can be added to the cheese through the anticaking agent. For example, it were desired to have cheddar flavored mozzarella cheese, this can be accomplished by adding concentrated natural cheddar flavor to the anticaking agent and then blending 1% to 2% of flavored anticaking agent into mozzarella cheese. Several experiments were designed to study if such flavors can be blended into the present anticaking agents successfully. Also, a long term study was launched to determine how long such flavors will be good both in the anticaking agent and in the cheese impregnated with such anticaking agent. The following formulas, in which ingredients are expressed in weight percent, were prepared and evaluated:

| 1. | Rice flour | 90.00 |
| | Bentonite | 5.00 |
| | Polydimethyl siloxane | 1.00 |
| | Concentrated parmesan flavor | 1.00 |
| | Sorbic acid | 2.00 |
| 2. | Microcrystalline cellulose | 99.00 |
| | Parmesan flavor | 1.00 |
| 3. | Rice flour | 86.00 |
| | Cellulose | 7.50 |
| | Bentonite | 2.00 |
| | Polydimethyl siloxane | 0.50 |
| | Sodium propionate | 4.00 |
| | Romano flavor | 2.00 |
| 4. | Rice flour | 80.00 |
| | Cellulose | 8.50 |
| | Dried cheese culture | 2.50 |
| | Bentonite | 0.25 |
| | Polydimethyl siloxane | 0.25 |
| | Glucose oxidase & catalase enzyme preparations | 1.00 |
| | Cheddar flavor | 7.50 |
| 5. | Rice flour | 86.00 |
| | Cellulose | 5.00 |
| | Dried cheese culture | 5.00 |
| | Mozzarella flavor | 2.00 |
| | Provolone flavor | 1.00 |
| | Cheddar flavor | 1.00 |

The above preparations were added to freshly diced or grated cheeses at the rate of 2.0% by weight and held for a period of 1 to 12 months, depending upon the cheese. Flavor analysis and bake analysis were performed, depending on the product, at specified intervals. Cheese alone, without any anticaking agent, served as a control. The results are summarized in Table 10.

Table 10 shows that flavored anticaking agents successfully can be applied to cheese. The anticaking agents of Example 10 show a superior ability to retain flavor over a long period. Flavors added to prior art anticaking agents increase flavor of cheeses for only a short term. It is a novel way to introduce exotic flavors, including smoke flavors, into the cheese. Using this technique, any natural and/or artificial cheese flavors, natural or artificial cheese powders, food flavors or fruit flavors can be introduced into cheese or other food products.

EXAMPLE 11

The popularity of skim milk cheese or partially skim milk cheeses is increasing dramatically. The only drawback with such cheeses is that they are deficient in fat soluble vitamin content. The traditional way of fortifying vitamin A and D is to add it to the milk prior to or during processing. The drawback with this system is that vitamins are lost into whey. Consequently, to retain a normal amount of vitamins in the finished product, an excess amount of vitamins must be added to the milk.

The addition of anticaking agent can be controlled so precisely that a calculated amount of vitamin fortified anticaking agent can be dispensed into the chunked skim or partially skim cheese to arrive at the prescribed amount of vitamins. A two pound quantity of skim cheese was manufactured in a laboratory scale using a traditional cheese making procedure. The cheese was shredded and divided into two fractions. The vitamin fortified anticaking agent is added at the rate of 2% by weight to one fraction and the other fraction received 2% anticaking agent without any vitamins. Both the cheeses were subjected to organoleptic analysis for a period of one month. The color, taste, and physical characteristics revealed no difference between the vitamin fortified cheese and the control cheese. This example clearly proved that vitamins can be introduced into the cheese through anticaking agent. Similar successful experiments also were conducted to introduce minerals, multi-minerals and vitamins, and several salts and emulsifying agents through the anticaking agent. Using this anticaking agent, a base cheese can be modified to have different minerals, vitamins, and salts content. For example, a high calcium cheese can be made for osteoporosis patients.

Emulsifying agents such as the salts and acids of citrates and phosphates can be added to the anticaking agent and then sprinkled onto cheese.

The following anticaking agent formulas, expressed in weight percent, were designed to include emulsifying agents, including both acid and salt:

| | | |
|---|---|---|
| 1. | Rice flour | 71.25 |
| | Food grade bentonite | 1.50 |
| | Cellulose | 10.00 |
| | Sorbic acid | 1.50 |
| | Sodium citrate | 10.00 |
| | Citric acid | 5.00 |
| | Polydimethyl siloxane | 0.50 |
| | Glucose oxidase & galactose oxidase/catalase enzyme preparations | 0.25 |
| 2. | Rice flour | 77.75 |
| | Food grade bentonite | 0.75 |
| | Cellulose | 5.00 |
| | Sorbic acid | 1.00 |
| | Phosphoric acid | 5.00 |
| | Disodium phosphate | 10.00 |
| | Polydimethyl siloxane | 0.25 |
| | Glucose oxidase & galactose oxidase/catalase enzyme preparations | 0.25 |
| 3. | Rice flour | 79.75 |
| | Dried cheese culture | 5.00 |
| | Cellulose | 5.00 |
| | Sodium citrate | 2.50 |
| | Disodium phosphate | 2.50 |
| | Hexa meta phosphate | 5.00 |
| | Glucose oxidase & galactose oxidase/catalase enzyme preparations | 0.25 |

All of the above anticaking agents individually were included into freshly diced, one day old mozzarella cheese at the rate of 2.0% by weight. The cheeses were refrigerated at 4° C. for a period of 6 to 8 hours to allow the salts to seep into the cheese. Cheese without any added anticaking agent served as a control. The cheeses were baked and evaluated according to the procedure outlined in Example 1. The results are presented in Table 11.

TABLE 11

| | Pizza evaluation for: | | | | |
|---|---|---|---|---|---|
| Anticaking agent used | Anticaking properties | Melt | Stretch | Tender-ness | Browning |
| none | + | + | + | + | Distinctive |
| 1. | ++++ | +++ | +++ | +++ | Slight |
| 2. | ++++ | ++ | ++ | +++ | Moderate |
| 3. | ++++ | +++ | +++ | +++ | Slight |

Excellent = ++++
Good = +++
Fair = ++
Poor = +

The results clearly indicate that the inclusion of emulsifying salts into anticaking agents and thus applied onto freshly diced immature mozzarella cheese greatly improved the quality of cheese on pizza in terms of melt, stretch, tenderness and reduction of browning or scorching. This discovery has utility in cooking and baking types of low fat cheeses such as mozzarella. Cheeses that are prematurely aged, fresh out of brine, or less than a day old can be made to melt on pizza by incorporating emulsifying salts through anticaking agents. Similarly, non-fat type cheeses can be made to melt better with the aid of emulsifying salts introduced through this anticaking agent. Several experiments were conducted using emulsifying salts in anticaking agent to melt fresh mozzarella cheese. The cheese treated by anticaking agent with emulsifying salts melted at zero age. The best melting properties were obtained by use of emulsifying salts and acids, such as sodium citrate and citric acid. The addition of low amounts of emulsifying salts was satisfactory to induce melting when applied thorough the anticaking agent.

EXAMPLE 12

The most commonly used anticaking agents of the prior art, such as silicon dioxide, sodium aluminum silicate, and cellulose were compared with the following preferred test formula for anticaking agent:

| | |
|---|---|
| Rice Flour | 95.50 |
| Cellulose | 1.50 |
| Bentonite | 0.10 |
| Acidic bacterial culture | 2.40 |
| Polydimethyl siloxane | 0.50 |

The acidic culture contained a small amount of organic acid, such as sorbic acid, which was beneficial in maintaining a low pH in the anticaking agent. This test formula was compared on the basis of anticaking properties and functional properties as applied to cheese. Two percent of each of the above mentioned anticaking agents was applied onto freshly diced mozzarella cheese and stored for 24 hours in a refrigerator. The cheeses with different anticaking agents were compared for anticaking properties. A bake analysis was conducted as outlined in Example 1. The following results were obtained:

TABLE 12

| No. | Type of anticaking agent used | Anticaking property | Bake analysis for: | | | |
|---|---|---|---|---|---|---|
| | | | Melt | Stretch | Flavor | Tenderness |
| 1. | None | + | ++ | +++ | ++ | ++ |
| 2. | Rice flour<br>Cellulose<br>Bentonite<br>Acidic starter culture<br>Polydimethyl siloxane | ++++ | +++ | ++++ | ++++ | ++++ |
| 3. | Cellulose | +++ | ++ | +++ | + | + |
| 4. | Silicon dioxide | +++ | + | ++ | ++ | + |
| 5. | Sodium aluminum silicate | +++ | ++ | ++ | ++ | ++ |

Excellent = ++++
Good = +++
Fair = ++
Poor = +

The results clearly indicate that the test formula for anticaking agent was superior as compared to other anticaking agents in terms of melt, stretch, and flavor retention as well as improving the tenderness of cheese on pizza pie.

EXAMPLE 13

The popularity of spicy cheeses is increasing progressively. The most popular spices used in cheeses are jalapino, red pepper, garlic, oregano, and dill. These spices are added either to the cheese curds and pressed, as with cheddar cheese, or added to the mixer molder as in the case of mozzarella and provolone. Also, spices traditionally are added to diced or shredded cheeses at the time of packaging by blending the spices with the chunked cheese. All of the above processes are expensive, cumbersome, need additional machinery, extra clean up, and cause severe contamination of equipment, both physically and microbiologically. Such spices and condiments can be included into the present anticaking agent and, thus, can be introduced into shredded or diced cheeses uniformly. Experiments were conducted using garlic and oregano in combination with the anticaking agent blended according to the test formula of Example 12. The dried spice preparations were included in the anticaking agent at the rate of 5.0% by weight. The spiced anticaking agent then were introduced into cheese at the rate of 2.0% by weight. The cheeses used in this example were cheddar, jack and mozzarella. The spice added cheeses were stored at 4° C. for a period of one month. Also, spices were added to the cheese without any anticaking agent and stored at 4° C. for a period of one month. At the end of four weeks, cheeses were evaluated for flavor differences. The results of this example are presented in Table 13.

TABLE 13

| No. | Spice used in the anti-caking agent | Type of cheese | Uniform distribution of the spice | Anticaking properties | Flavor evaluation |
|---|---|---|---|---|---|
| 1. | Red pepper | Cheddar | ++++<br>(++) | ++++<br>(+) | ++++<br>(++) |
| | | Mozzarella | ++++<br>(++) | ++++<br>(+) | ++++<br>(++) |
| | | Jack | ++++<br>(++) | ++++<br>(+) | ++++<br>(+++) |
| 2. | Oregano | Cheddar | ++++<br>(++) | ++++<br>(+) | +++<br>(+) |
| | | Mozzarella | +++ | ++++ | ++++ |

TABLE 13-continued

| No. | Spice used in the anti-caking agent | Type of cheese | Uniform distribution of the spice | Anticaking properties | Flavor evaluation |
|---|---|---|---|---|---|
| | | | (+++) | (+) | (++) |
| | | Jack | ++++<br>(++) | ++++<br>(+) | ++++<br>(++) |
| 3. | Garlic | Cheddar | ++++<br>(++) | ++++<br>(+) | ++++<br>(+++) |
| | | Mozzarella | ++++<br>(++) | ++++<br>(+) | ++++<br>(+++) |
| | | Jack | ++++<br>(++) | ++++<br>(+) | ++++<br>(+++) |

Excellent = ++++
Good = +++
Fair = ++
Poor = +
Results presented within parenthesis represent cheese with spices added without added anticaking agent.

The results clearly indicate that the spices blended with anticaking agent and thus applied onto cheese exhibited better distribution, excellent flavor retention, and finally the cheese did not clump and was free flowing.

EXAMPLE 14

The effect of different flours has been tried in the present anticaking agent formulas. They are as follows: rice, wheat, all purpose, corn, and potato. The anticaking agents were formulated with ingredients in the following weight percents:

| | |
|---|---|
| Flour | 90.0 |
| Micro-crystalline cellulose | 5.0 |
| Cheese bacterial culture | 5.0 |

All these anticaking agents with different flours were applied onto the diced mozzarella cheese at the rate of 2.0% by weight and evaluated for the anticaking and organoleptic properties. The results are summarized in Table 14.

TABLE 14

| No. | Kind of flour used as main base for the anti-caking agent | Anticaking property | Color of the cheese | Mouth feel | Flavor of the cheese |
|---|---|---|---|---|---|
| 1. | Rice | ++++ | ++++ | ++++ | ++++ |
| 2. | Wheat | ++++ | +++ | +++ | +++ |
| 3. | All-purpose | ++++ | +++ | +++ | ++ |
| 4. | Corn | +++ | ++ | ++ | ++ |
| 5. | Potato | ++ | ++ | +++ | ++ |
| 6. | Control: No anticaking agent | ++ | ++++ | ++++ | ++++ |

Excellent = ++++
Good = +++
Fair = ++
Poor = +

The results clearly indicate that rice flour ranked the best in terms of exhibiting anticaking properties when applied onto the cheese. Even though other flours can also be used as bases for an anticaking agent, special attention should be paid to flavor characteristics. Some of the flours did alter the color and flavor of the cheese due to their natural color and flavor. If slightly off color is preferred, a flour such as wheat can be used in the current formulation. Consequently, the formula can be custom tailored to fit to the needs of different non-colored cheeses. For example, mozzarella cheese imported from New Zealand has a yellowish tinge. In such an off colored cheese, wheat flour base anticaking agent is much preferred over the white colored rice flour. People in the trade can alter the flours to fit to the needs of their customers.

EXAMPLE 15

The effect of various other food ingredients also have been rested as bases in the present anticaking agent formulas in terms of anticaking properties, color, and organoleptic properties of the final cheese. The following food ingredients have been included as bases in the anticaking agent: wheat fiber, rice-maltodextrin, corn-maltodextrin, starch, and modified starch (gelatinized). The following anticaking agent formula, expressed in weight percent, was used as control:

| | |
|---|---|
| Rice flour | 85.80 |
| Cellulose | 10.00 |
| Bentonite | 1.00 |
| Polydimethyl siloxane | 0.20 |
| Dried bacterial culture | 2.50 |
| Glucose oxidase/catalase enzyme preparation | 0.50 |

In each experiment with a new ingredient, the new ingredient was used in the place of rice flour. The different bases were blended in anticaking agent and 2.0% by weight was applied onto freshly shredded, high moisture (52.5%) mozzarella cheese. The cheese was stored at 4° C. for 1 week, after which it was evaluated for the flowability, flavor, and mouth feel. The results are presented in Table 15.

TABLE 15

| No. | Kind of base used for the anti-caking agent | Anticaking property | Color of the cheese | Mouth feel | Flavor of the cheese |
|---|---|---|---|---|---|
| 1. | Rice flour | ++++ | ++++ | ++++ | ++++ |
| 2. | Wheat fiber | +++ | +++ | ++++ | ++ |
| 3. | Rice-maltodextrin | ++ | ++++ | ++++ | ++++ |
| 4. | Corn-maltodextrin | ++ | ++++ | ++++ | ++++ |
| 5. | Starch | ++ | ++++ | ++++ | ++++ |
| 6. | Modified starch (gelatinized) | ++ | ++++ | ++++ | ++++ |
| 7. | None | + | ++++ | ++++ | ++++ |

Excellent = ++++
Good = +++
Fair = ++
Poor = +

The results clearly indicate that rice flour was far superior to all other tested ingredients both in terms of inducing anticaking properties and maintaining organoleptic properties. Even though maltodextrins and starches did not alter the organoleptic properties, their anticaking properties were inferior to rice flour. However, all the ingredients tested did have some degree of anticaking properties, indicating any of these ingredients can be used as bases for this anticaking agent even though they may not be as effective as rice flour.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. The method of treating a divided cheese product for anticaking and improved functionality, comprising:
   applying to a divided cheese product a dry, powdered mixture of flour and cellulose.

2. The method of claim 1, wherein said mixture further comprises dry, powdered bacterial culture having an acidic pH sufficiently low to inhibit further bacterial growth.

3. The method of claim 1, wherein said mixture further comprises dry, powdered flavoring compound.

4. The method of claim 3, wherein said flavoring compound is selected from the group consisting of flavors of diacetyl, romano, parmesan, cheddar, mozzarella and provolone cheeses, or mixtures thereof.

5. The method of claim 1, wherein said flour is at least as fine as of 120 mesh U.S. sieve size.

6. The method of claim 1, wherein said mixture further comprises dry, powdered multi-vitamins.

7. The method of claim 1, wherein said mixture further comprises dry, powdered antimycotic agent.

8. The method of claim 1, wherein said mixture further comprises dry, powdered coloring agent.

9. The method of claim 1, wherein said flour is selected from the group consisting of flee, wheat, corn, potato, and mixtures thereof.

10. The method of claim 1, wherein said mixture further comprises dry, powdered defoamer.

11. The method of claim 10, wherein said defoamer comprises polydimethyl siloxane.

12. The method of claim 1, wherein said mixture further comprises dry, powdered enzymes selected from the group consisting of glucose oxidase, galactose oxidase, catalase, and lactase or mixtures thereof; and excluding glucose.

13. The method of claim 1, wherein said mixture further comprises dry, powdered acidifying means for adjusting pH of the mixture into the range pH 4.0 through pH 5.5.

14. The method of claim 13, wherein said acidifying means are in quantity sufficient for adjusting pH into the range pH 4.75 through pH 5.3.

15. The method of claim 13, wherein said acidifying means are selected from the group consisting of citric acid, phosphoric acid, lactic acid, sorbic acid, ascorbic acid, and mixtures thereof.

16. The method of claim 13, wherein said acidifying means comprises acidic bacterial culture having pH sufficiently low to inhibit further bacterial growth.

17. The method of claim 1, wherein said mixture further comprises dry, powdered emulsifying agent.

18. The method of claim 17, wherein said emulsifying agents are selected from the group consisting of acids of phosphates, salts of phosphates, acids of citrates, salts of citrates, and mixtures thereof.

19. The method of claim 1, wherein said mixture further comprises dry powdered bentonite.

20. A method of treating a divided cheese product for anticaking and improved functionality, comprising:

applying to a divided cheese product a mixture of dry, powdered flour and dry, powdered bentonite, wherein said bentonite comprises no more than 10 percent by weight of the mixture.

21. The method of claim 20, wherein the flour is at least as fine as U.S. sieve size 120 mesh.

22. The method of claim 20, wherein the flour is selected from the group consisting of rice, wheat, corn, potato, and mixtures thereof.

23. The method of claim 20, wherein said mixture further comprises dry, powdered, bacterial culture having an acidic pH sufficiently low to inhibit further bacterial growth.

24. The method of claim 20, wherein said mixture further comprises dry, powdered defoamer.

25. The method of claim 24, wherein the defoamer comprises polydimethyl siloxane.

26. The method of claim 20, wherein said mixture further comprises dry, powdered antimycotic agent.

27. The method of claim 20, wherein said mixture further comprises dry, powdered enzymes selected from the group consisting of glucose oxidase, galactose oxidase, catalase, and lactase or mixtures thereof; and excluding glucose.

28. The method of claim 20, wherein said mixture further comprises dry, powdered acidifying means sufficient for adjusting pH into the range pH 4.0 through pH 5.5.

29. The method of claim 20, wherein said mixture further comprises dry, powdered emulsifying agent.

30. The method of treating a divided cheese product for anticaking and improved functionality, comprising;

applying to a divided cheese product a mixture of dry, powdered cellulose and dry, powdered bentonite, wherein said bentonite comprises no more than 10 percent by weight of the mixture.

31. The method of claim 30, wherein said mixture further comprises dry, powdered emulsifying agent.

32. The method of claim 30, wherein said mixture further comprises a dry, powdered ingredient selected from the group consisting of starch and modified starch.

33. The method of claim 30, wherein said mixture further comprises dry, powdered flour.

* * * * *